(No Model.)
W. L. CHIPLEY.
EGG BOILER AND STEAMER.
No. 341,878. Patented May 18, 1886.
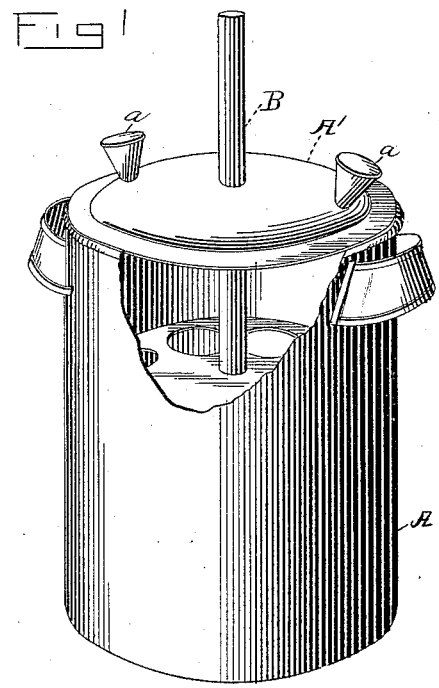
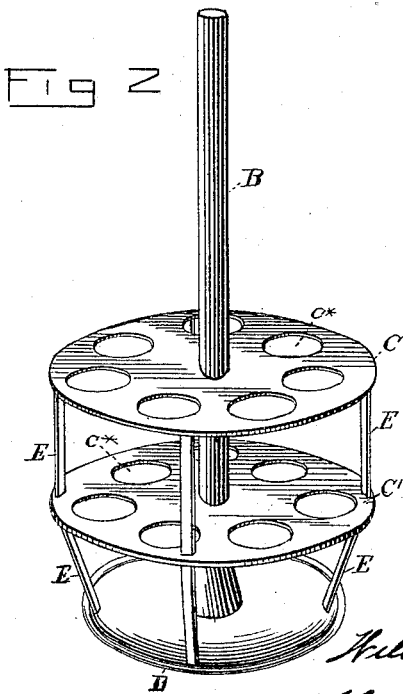
WITNESSES:
INVENTOR:

UNITED STATES PATENT OFFICE.

WILLIAM L. CHIPLEY, OF LAMONTE, MISSOURI.

EGG BOILER AND STEAMER.

SPECIFICATION forming part of Letters Patent No. 341,878, dated May 18, 1886.

Application filed June 18, 1885. Serial No. 169,074. (No model.)

*To all whom it may concern:*

Be it known that I, WILLIAM L. CHIPLEY, a citizen of the United States, residing at Lamonte, in the county of Pettis and State of Missouri, have invented certain new and useful Improvements in Egg Boilers and Steamers, of which the following is a specification, reference being had to the accompanying drawings.

My invention relates to apparatus for boiling or steaming articles of food, and has for its object the provision of a simple and efficient device for containing eggs, potatoes, turnips, beets, onions, &c., to be placed in or over hot water, whereby they may be safely placed in and instantaneously removed from the water. For boiling I have a sufficient amount of water to cover the articles to be treated, while for steaming I employ only so much water in the bottom of the vessel as will afford sufficient steam to do the work.

I employ a suitably-shaped vessel (preferably circular) with straight sides, into which is removably placed or plunged the egg or other supporter, which I will here describe in a general way, and hereinafter particularly specify by letters of reference, and set forth in the claim. Said supporter consists of several shelves or foraminous plates mounted on a central rod or stem, with a flat imperforate pedestal at the bottom. The lower imperforate plate may be smaller than the superposed foraminous plates, and stiffening rods or braces may be inserted through or secured to the rims of the plates at suitable distances apart around the circumference of the plates. These braces prevent the weight of the articles being cooked from bending the plates, and also enables one to use lighter material for the plates. The central rod or stem, to which the plates are secured, passes through the lid or cover of the vessel, and may be secured thereto or work freely therein, as may be desired.

The articles held on the lower food-supporting plate, if immersed in the water, and those held upon the upper one, if above the water, will receive different degrees of heat, and consequently one will be cooked harder than the other. This may often be desirable in cooking eggs. The perforations in the shelves afford means for holding the eggs or vegetables.

It will be understood that the supporter may be manufactured and sold separately from the vessel, and may be used in any vessel. It will be appreciated, too, that in use, when the supporter is removed from the vessel, all the water will at once drain off and leave the articles cooked at once exposed on all sides to the air.

The accompanying drawings illustrate what I consider the best means for carrying my invention into practice.

Figure 1 is a perspective view of a vessel containing my device, a part of the wall being broken away to show it. Fig. 2 is a perspective view of the supporter removed.

Similar letters of reference indicate corresponding parts in both the figures where they occur.

A is the body of the vessel for containing the water, into or above which the supporter is to be placed. This body may be of any desired shape; but the ordinary round form will of course be preferable, for the same reasons that it is preferable in all vessels where it is used. The body may be supplied with ears or handles, as shown, and a lid, A', of ordinary construction may be placed upon the body A. This lid has buttons or studs $a\,a$, by which it may be removed, and is centrally perforated for the admission of the central rod or stem of the supporter. This stem or rod is marked B, and has secured to it at suitable height and distance apart two or more food-supporting plates or disks, C C', which are provided with openings $c^*\,c^*$, which receive the sides or ends of the articles to be treated and hold them against rolling off, and at the same time expose their under sides to the steam or water, and materially aid in the cooking.

At the bottom of the stem or rod B is provided a flat pedestal or plate, D, which serves as a support for the supporter when it is removed from the vessel and set upon a table or in a sink or elsewhere, and will prevent it from being overturned. This bottom plate, D, may be solid, or may consist of simply a frame or radial arms to prevent the supporter from toppling over. The plate D is smaller than the plates C C' above it in point of diameter. This enables me to use the device in a vessel with contracted bottom, when necessary, and when used in a plain cylindrical vessel it leaves a space around it in which the steam can rise and circulate above.

Stay-rods or braces E E are secured to the three rods at or near their edges at suitable distances apart, and prevent the weight of the sustained vegetables or other material from bending or breaking the plate.

The lower plate, D, is a sufficient distance below the lower food-plate, C', to admit of a body of water being in the bottom of the pot without covering the plate C', so that steaming can be done in case of vegetables.

Having thus described my invention, what I desire to claim and secure by Letters Patent is—

An egg or vegetable boiler or steamer consisting of a central stem, as B, two or more perforate plates, C C', mounted thereon, and a plate, D, of smaller diameter than plates C C', mounted upon the bottom of said rod, and a suitable containing-vessel, substantially as and for the purpose set forth.

In testimony whereof I affix my signature in presence of two witnesses.

WILLIAM L. CHIPLEY.

Witnesses:
WILLIAM C. WISE,
JOHN A. WARD.